March 17, 1931.  R. W. SNYDER  1,797,180
APPARATUS FOR CURING TIRE FLAPS
Filed Dec. 1, 1927  3 Sheets-Sheet 3

Inventor
Robert W. Snyder.
By
Attorney

Patented Mar. 17, 1931

1,797,180

UNITED STATES PATENT OFFICE

ROBERT W. SNYDER, OF AKRON, OHIO, ASSIGNOR TO THE GOODYEAR TIRE & RUBBER COMPANY, OF AKRON, OHIO, A CORPORATION OF OHIO

APPARATUS FOR CURING TIRE FLAPS

Application filed December 1, 1927. Serial No. 237,010.

The invention relates to apparatus for curing continuous bands of vulcanizable material and has particular relation to an apparatus of the above designated character for curing continuous bands of tire flap material.

One object of the invention is to provide a relatively inexpensive apparatus for curing tire flap material having a relatively great production capacity per unit area of factory floor space required.

Another object of the invention is to provide an apparatus for curing successive lengths of tire flap material as the lengths of material are intermittently unwound from a plurality of supplying reels.

Another object of the invention is to provide an apparatus which will permit a substantial reduction in the number of workmen formerly required for curing a given quantity of tire flap material and also which will dispense with numerous trucks and other auxiliary apparatus previously required.

Another object of the invention is to provide an apparatus for curing single thicknesses of tire flap material by direct engagement of the material with a heating device.

Prior to this invention, continuous lengths of tire flap material were wound spirally upon a grooved reel, after which a plurality of the reels were loaded upon a truck which was rolled upon a track into a heater. While the flap material on the reels of the first truck was being cured in the heater, a second truckload of reels was supplied with flap material. Since the flap material was formed on the reels in spirally wound rolls, it is apparent that the heat was required to be conducted normally to the edges of each convolution of the material in order to provide heat for curing the central portion of the rolls. Obviously, a substantial lapse of time occurred before the heat reached the central portion of the rolls and consequently the material was not cured uniformly. The inner and outer convolutions of the roll of material, being directly exposed to the heat in the surrounding heater, they were cured to a greater extent than the convolutions nearer the central portion of the strip of material.

This invention comprises a rotatable drum provided with a plurality of segmental shoes for pressing successive lengths of flap material against the drum. Bite rollers are provided for engaging the material on opposite sides of the drum and the rollers are driven intermittently with the drum during periods when the shoes are withdrawn. The relative peripheral speeds of the pairs of bite rollers are such as to exert a tensioning force within the flap material supported by the drum. Successive lengths of the flap material thus intermittently are brought under tension into immediate contact with the drum where the lengths are cured under the additional pressure of the shoes which close alternately with respect to the movement of the material. Thereafter, the lengths of material are withdrawn from the heater and permitted to cool before being wound upon adjacent reels.

For a better understanding of the invention, reference may now be had to the accompanying drawings, forming a part of this specification, in which.

Figure 1:
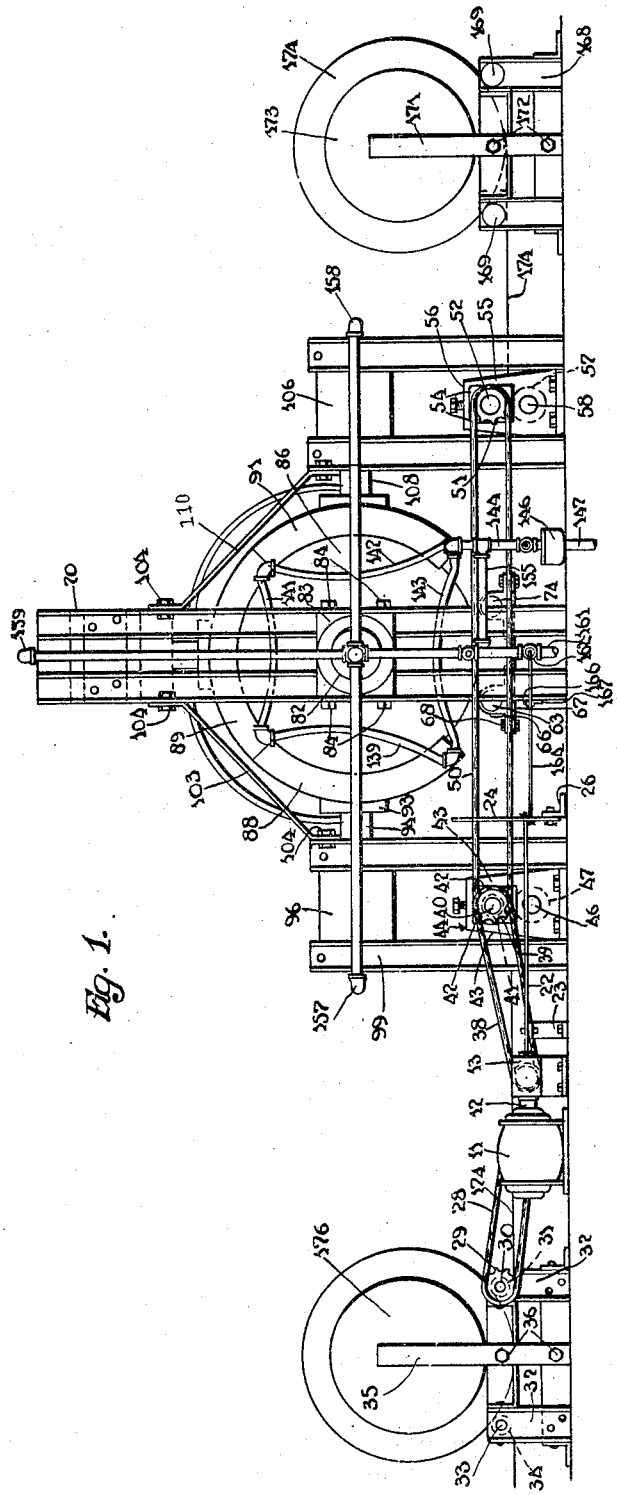
Fig. 1 is an end elevational view of an apparatus illustrating one embodiment of the invention.

In the illustrated embodiment of the invention, a motor 11 is operatively connected to a reduction gear, indicated at 13, by a shaft 12. A short shaft 14 extends from the reduction gear 13 normally to the vertical plane of the shaft 12 and is provided with an element 16 of a clutch 17. One end of a shaft 18 is rotatably mounted in the outer end of the shaft 14, while the opposite end portion thereof is rotatably journaled in a bearing 19. The shaft 18 has a movable clutch element 21 keyed thereon which is adapted to be moved into engagement with the element 16. The clutch element 21 is pivotally secured between the forked ends of a lever 22 which is in turn pivotally secured to a vertical bracket 23. The opposite end of the lever 22 is pivotally mounted within an opening intermediate the ends of a control lever 24. This lever is pivotally mounted adjacent its lower end in a bracket 26 rigidly secured to a floor or other suitable support. When the lever 24 is moved in the direction of the arrow (see Fig. 2) the clutch element 21 engages the element 16, thus causing rotation of the shaft 18 by the motor 11.

The end of the shaft 18 beyond the bearing 19 is provided with a sprocket wheel 27 for driving a chain 28, which in turn drives a sprocket wheel 29. The wheel 29 is keyed upon one of the reduced ends 30 of a roller 31, the ends 30 being rotatably journaled adjacent corresponding upper corners of spaced frame members 32. Reduced ends 33 of a roller 34 also are journaled in the frame members 32 adjacent upper corners thereof opposite to those supporting the roller 31. Vertically extending guide bars 35 are bolted, as indicated at 36, to each of the frame members 32 adjacent the central portions thereof.

A second sprocket wheel 37 is keyed upon the shaft 18 between the bearing 19 and the clutch 17. This sprocket wheel engages a chain 38 which also is engaged by a sprocket wheel 39 rigidly secured on one of the reduced ends 40 of a roller 41. The reduced ends 40 of the roller 41 are rotatably journaled in bearing blocks 42 which are slidably mounted between spaced vertical guides 43 that are formed integrally with pedestal bearings 44. Spaced circumferentially formed projections 45 extend from the surface of the rollers 41 throughout a substantial portion of its length. Immediately beneath the roller 41, the reduced ends 46 of a second roller 47 are rotatably mounted in the pedestal bearings 44, the latter roller being provided with recesses 48 complementary to the enlarged portions 45. As the roller 41 is rotatably journaled in vertically movable bearing blocks 42, its weight constantly urges it into driving relationship with the roller 47.

A sprocket wheel 49 is rigidly mounted on the reduced end 40 of the roller 41 adjacent the sprocket wheel 39. A chain 50 trained about the sprocket 49 also engages a sprocket wheel 51 that is rigidly mounted on one of the reduced ends 52 of a roller 53. Bearing blocks 54, which rotatably support the ends 52, are slidably mounted between vertical guides 55 formed integrally with pedestal bearings 56. A roller 57, having reduced ends 58 journaled in the pedestal bearings 56 immediately beneath the roller 53, is adapted to support and consequently to be driven by the latter. A sprocket wheel 59 is keyed upon the reduced end 40, of the roller 41, opposite the end supporting the sprocket wheels 39 and 49. A sprocket chain 61 operatively engages this sprocket wheel and a second sprocket wheel 62, which is rigidly mounted on one of the reduced ends 63 of a roller 64. The roller 64 also is provided with spaced circumferentially formed projections 65. The reduced ends 63 of the roller 64 are rotatably journaled in bearings 66 that are bolted to brackets 67, as indicated at 68. The brackets 67 are rigidly secured to spaced vertical frames 69 and 70. The opposite reduced end 63 of the roller 64 also has a sprocket wheel 71 rigidly secured thereto which is adapted to drive a chain 72 also trained about a sprocket wheel 73. One end 74 of a roller 76, rigidly supports the sprocket wheel 73 and the roller is journaled in bearings 77 that are rigidly supported by the frames 69 and 70. The roller 76 also is provided with spaced circumferentially formed projections 78 which correspond in number and relative position to the projecting portions 65 of the roller 64.

Figure 3:
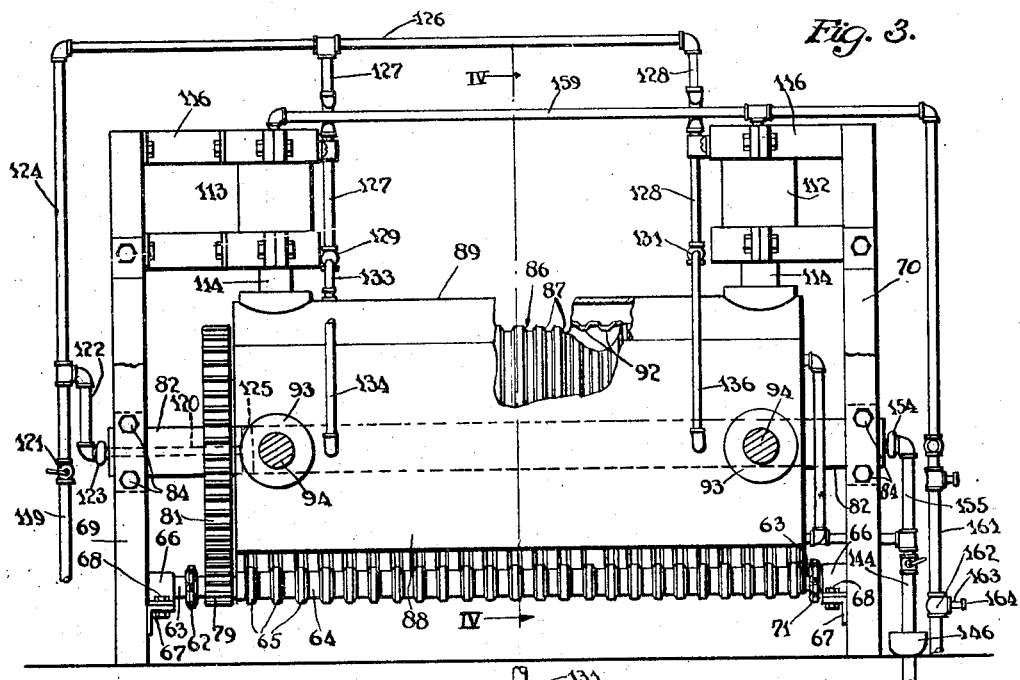
Fig. 3 is a side elevational view of a heater forming a part of the apparatus, as seen to the right hand side of line III—III of Fig. 2.
Figure 4:
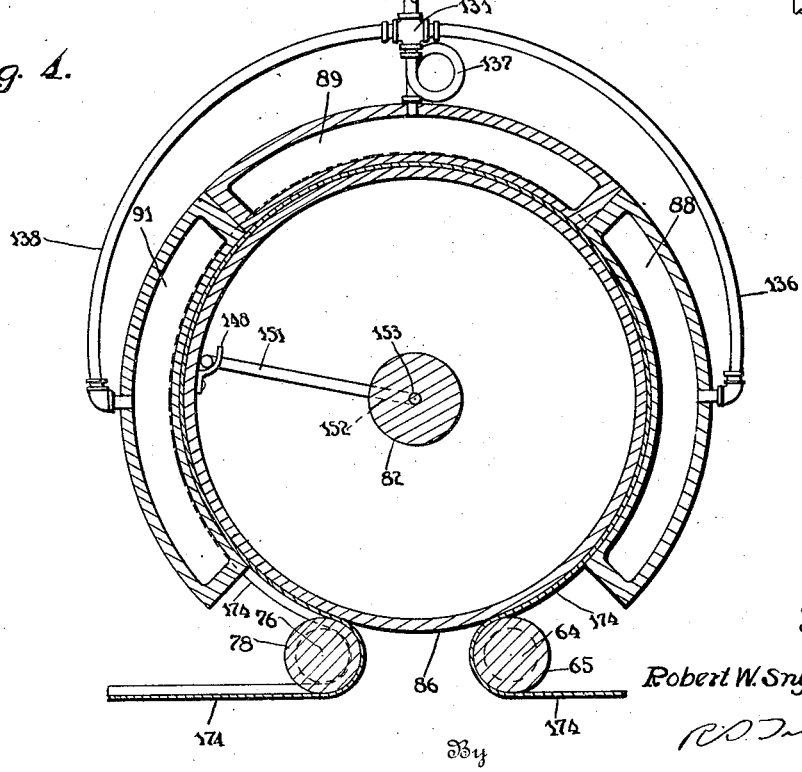
Fig. 4 is a cross-sectional view of the heater taken to the right hand side of line IV—IV of Fig. 3.

A pinion 79 (Fig. 3) rigidly mounted on the reduced end 63 of the roller 64, between the enlarged portion of the roller and the sprocket wheel 62, meshes with a relatively large gear wheel 81 which is keyed upon a shaft 82. Bearing blocks 83 rotatably support the end portions of the shaft and are bolted to the frames 69 and 70, as indicated at 84. A large cylindrical drum 86 is rigidly mounted on an intermediate portion of the shaft 82 and is provided with spaced circumferential grooves 87 formed substantially throughout its entire external surface. The grooves 87 are complementary to the projecting portions 65 and 78 which are formed respectively on the rollers 64 and 76. A plurality of arcuate chambered shoes 88, 89 and 91 extend longitudinally of the drum 86 and are adapted to surround a greater portion of the surface of the latter. The shoes 88, 89 and 91 are provided with arcuate projections 92 which are complementary to and are adapted to extend within the grooves 87 formed in the outer surface of the drum 86.

Bosses 93 formed on the shoe 88 adjacent the opposite ends thereof are adapted to receive the ends of piston rods 94 that extend through openings formed in the ends of cylinder 96 and 97. The cylinder 96 is rigidly secured by brackets 98 to the upper end of a vertical frame 99. The cylinder 97 is similarly secured by brackets 101 to a second vertical frame 102. The frames 99 and 102 are rigidly secured to an upper portion of the frames 69 and 70 by bars 103 which are bolted to the respective frames, as indicated at 104. Cylinders 106 and 107 have piston rods 108 extending therefrom, the outer ends of which are rigidly secured to the shoe 91. The cylinders 106 and 107 are supported by brackets 105 that are connected to vertical frames 109 and 111, which are in turn rigidly secured to the frames 70 and 69 respectively by bars 110 bolted therebetween. Cylinders 112 and 113 are provided with piston rods 114 which are rigidly secured at the ends thereof remote from the cylinders to the shoe 89. Brackets 116, supporting the cylinders 112 and 113, are rigidly secured to the upper ends of the frames 70 and 69. All of the cylinders 96, 97, 106, 107, 112 and 113 are provided with pistons 117 which are rigidly mounted on the ends of the respective piston rods 94, 108 and 114 extending within the cylinders. Springs 118 are confined upon the piston rods in each of the cylinders between the pistons 117 and the ends of the respective cylinders adjacent the shoes. The springs 118 tend to maintain the shoes 88, 89 and 91 in spaced relation to the surface of the drum 86.

A conduit 119 (Fig. 3) is adapted to supply steam or other suitable heating fluid to the interior of the drum 86 and the shoes 88, 89 and 91. A valve 121 is inserted in the conduit 119 and serves to control the flow of heating fluid therethrough. The conduit 119 is connected to the interior of the drum 86 by a conduit 122 having a swivel connection 123 mounted in an opening 120 in the end of the shaft 82 which opening extends axially through a portion of the shaft and terminates in a transverse opening 125 communicating with the interior of the drum 86. Conduits 124 and 126 also are connected to the conduit 119, the conduit 124 being provided with branches 127 and 128 that are connected to three-way couplings 129 and 131. The coupling 129 is connected to the interior of the shoes 88, 89 and 91 by flexible conduits 132, 133 and 134. The coupling 131 likewise communicates with the interior of shoes 88, 89 and 91 by means of flexible conduits 136, 137 and 138. It will be apparent that when the valve 121 is opened, heating fluid will be supplied continuously to the interiors of the shoes 88, 89 and 91, as well as to the interior of the drum 86.

In order to expel condensation liquid from the interior of shoes 88, 89 and 91, conduits 139, 141, 142 and 143 are connected to the shoes at the lowest portions thereof, all of the conduits being interconnected as indicated, thus forming a single communicating passage between the shoes. A conduit 144 connects the communicating passage formed by the conduits 139, 141, 142 and 143 to a steam trap 146 from which the condensation liquid is adapted to be discharged through a conduit 147.

A trough 148 is so mounted in an inclined position within the interior of the drum 86 as to elevate the liquid of condensation at each revolution of the drum to a position above the horizontal plane of the center of the shaft 82. A conduit 151, communicating with one end of the trough 148, is adapted to convey the liquid therein to an opening 152 formed radially in the shaft 82 which in turn conducts the liquid into an opening 153 which is formed axially of the shaft. The opening 153 has a swivel connection 154 mounted therein which communicates with the steam trap 146 through a conduit 155 and the conduit 144. It is apparent that the liquid of condensation within the drum 86 will be discharged at each revolution of the drum through the opening 153, into the swivel connection 154 from which it will flow through the conduits 155 and 144 into the steam trap 146.

The ends of the pairs of cylinders 96 and 97, 106 and 107, and 112 and 113, opposite the springs 118 therein, are connected respectively by conduits 157, 158 and 159 to a compressed air supply conduit 161. A spring closed globe valve 162, having a stem 163 extending therefrom, is provided in the conduit 161 and is adapted to be engaged by the end of a lever 164, which is pivotally secured intermediate the ends thereof upon a pin 166 mounted in a bracket 167 extending from the frame member 70. The opposite end of the lever 164 is pivotally secured to an intermediate portion of the lever 24.

Figure 2:
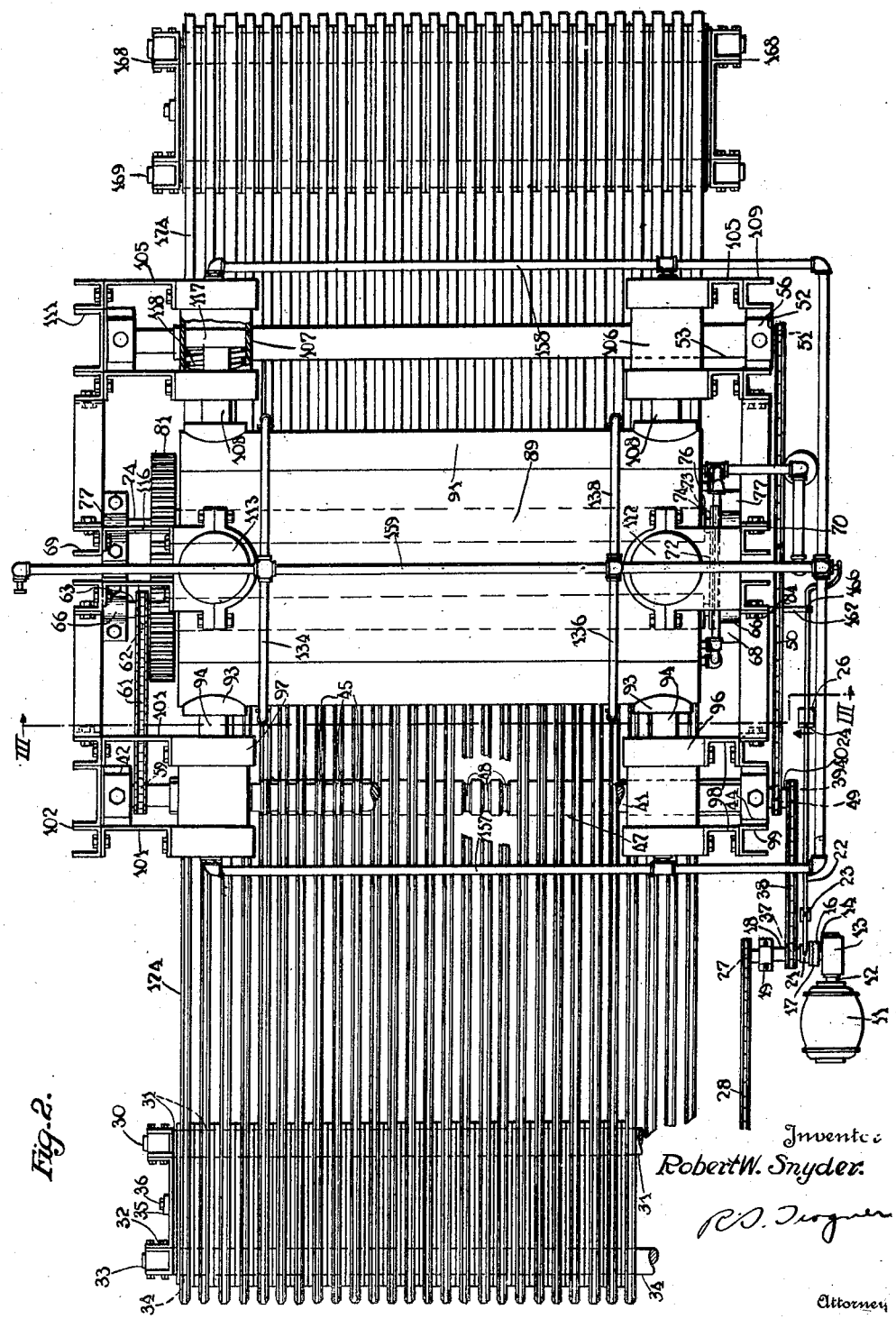
Fig. 2 is a plan view of the apparatus illustrated by Fig. 1, certain portions of the apparatus being illustrated in cross-section.

It is to be understood that the globe valve 162 is opened by depressing the stem 163, when the lever 24 is moved in a direction opposite that indicated by the arrow (Fig. 2). Thus the globe valve 162 is opened by a movement of the lever 24 in a direction opposite to that which results in the closing of the elements of the clutch 17.

Frames 168 are mounted in a vertical position in spaced relation to each other adjacent the frames 109 and 111. Rollers 169 are rotatably mounted in the frames 168 in the upper opposite corners thereof. Guide bars 171 are bolted in a vertical position at the end of the frames 168, as indicated at 172.

A plurality of reels 173 of tire flap material 174 are adapted to be positioned in side by side relationship upon the rollers 169 between the guide bars 171. The flap material 174 from each of the reels 173 is adapted to be unwound therefrom and threaded between the rollers 53 and 57, around the projections 78 on the rollers 76, within the grooves 87 on the drum 86, around the projections 65 on the roller 64, between the projections 45 and the recesses 48 on the rollers 41 and 47 respectively, and secured to the reels 176 which are adapted to be positioned in side by side relationship upon the rollers 31 and 34. When the lever 24 is moved in the direction of the arrow (see Fig. 2) the flap material 174 consequently will be unwound from the reels 173 and again rewound upon the reels 176.

The diameters of the material engaging portions of rollers 41 and 47 is slightly greater than the corresponding diameters of the rollers 53 and 57. Consequently, the first pair of rollers tends to convey the flap material 174 at a slightly greater rate than the later pair. Thus, it is apparent that the material always is maintained under a degree of tension from the drum 86 to the roller 41 depending upon the differential peripheral speed of the rollers.

As the lever 24 is moved in a direction opposite the arrow (Fig. 2) the transportation of the material between the reels 173 and 176 is discontinued, and, at the extreme limit of the movement of the lever 24, the valve 162 is opened, thus permitting air under pressure to flow into all of the cylinders 96, 97, 106, 107, 112 and 113. Consequently the springs 118 are compressed by the pressure of the air against the opposite sides of the pistons 117 and the shoes 88, 89 and 91 are urged into contact with the drum 86. A plurality of lengths of the flap material 174 thus are compressed simultaneously between the heated drum 86 and the heated shoes 88, 89 and 91. At the expiration of a predetermined period of time required for curing flap material, the lever 24 is moved in the opposite direction, thus releasing the flap material from between the shoes 88, 89 and 91 and the drum 86, after which the material again is set in motion towards the reels 176. When the ends of the lengths of flap material 174 cured by the previous operation of the apparatus approach the lower edge of the shoe 88, the lever 24 is again so moved as to discontinue the movement of the flap material and close the shoes 88, 89 and 91 upon the drum 86.

From the foregoing description, it is apparent that the invention provides an extremely economical apparatus for curing tire flap material, which is adapted to operate intermittently upon continuous strips of uncured material. It is also apparent that by employing the apparatus embodying the invention, a great number of operations previously required in the process of curing tire flap material now are obviated. Since it is unnecessary to handle the material except in supplying and removing it from the apparatus, the number of workmen required for operating the apparatus is relatively small.

Although I have illustrated only the preferred form which the invention may assume and have described that form in detail, it will be apparent to those skilled in the art that it is not so limited but that various modifications may be made therein without departing from the spirit of the invention or from the scope of the appended claims.

What I claim is:

1. An apparatus for curing tire flap material comprising a heater for supporting flap material thereon, means for feeding flap material to the heater, and means for delivering the material from the heater, the two means being interconnected by means positively driving them at differential speeds.

2. An apparatus for curing tire flap material comprising spaced pairs of bite rollers for feeding a strip of flap material, means between the pairs of rollers for curing the material and means for driving the rollers at differential peripheral speeds.

3. An apparatus for curing tire flap material comprising a heated rotatable drum for supporting a length of tire flap material thereon, a pair of feeding devices for the material located on opposite sides of the drum, means interconnecting the devices for positively driving them at differential speeds and intermittently operable means for operating the feeding devices and for rotating the drum.

In witness whereof, I have hereunto signed my name.

Signed at Akron, in the county of Summit, and State of Ohio, this 30th day of November, 1927.

ROBERT W. SNYDER.